(12) United States Patent
Barton

(10) Patent No.: US 9,342,531 B2
(45) Date of Patent: May 17, 2016

(54) MANAGING CONFLICTED COPIES

(71) Applicant: Dropbox, Inc., San Francisco, CA (US)

(72) Inventor: Chris Barton, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 411 days.

(21) Appl. No.: 13/890,933

(22) Filed: May 9, 2013

(65) Prior Publication Data

US 2014/0337278 A1    Nov. 13, 2014

(51) Int. Cl.
*G06F 17/30* (2006.01)

(52) U.S. Cl.
CPC .................. *G06F 17/3023* (2013.01)

(58) Field of Classification Search
None
See application file for complete search history.

(56) References Cited

U.S. PATENT DOCUMENTS

| | | | | |
|---|---|---|---|---|
| 8,572,022 B2* | 10/2013 | Hagan | ............... | G06F 17/30581 707/610 |
| 8,762,332 B2* | 6/2014 | Keebler | .................. | 707/610 |
| 9,043,276 B2* | 5/2015 | Kiilerich | ................. | H04L 67/06 707/621 |
| 2003/0055825 A1* | 3/2003 | Chen | ................. | G06F 17/30575 |
| 2006/0288053 A1* | 12/2006 | Holt | ................. | G06F 17/30578 |
| 2010/0088297 A1* | 4/2010 | Kiilerich | ................. | H04L 67/06 707/705 |
| 2010/0138387 A1* | 6/2010 | Simelius | ........... | G06F 17/30174 707/624 |
| 2011/0218964 A1* | 9/2011 | Hagan | ............... | G06F 17/30581 707/626 |
| 2012/0185434 A1* | 7/2012 | Giampaolo | ......... | H04L 67/1095 707/634 |
| 2014/0095929 A1* | 4/2014 | Chan | ................... | G06F 11/1471 714/20 |

* cited by examiner

*Primary Examiner* — Debbie Le
(74) *Attorney, Agent, or Firm* — Polsinelli PC

(57) ABSTRACT

Various embodiments provide a method of managing and preventing conflicted copies of a content item. For example, as changes are made to a content item, either by multiple users simultaneously or by a single user utilizing multiple devices, conflicted copies can be inadvertently created. These conflicted copes are multiple copies of the same content item where each copy may separately contain unique changes. Heuristics can be used to help users more easily avoid or manage these conflicted copies. In one example, a user could be notified and shown the difference between copies to either accept or reject changes. Further, users could also be notified when modifying a content item on a device that has not been synchronized in a determined period of time, or when the content item is known to be modified but the changes have yet to be synchronized to the device.

20 Claims, 7 Drawing Sheets

| Name | Date Modified |
|---|---|
| ☐ Document.doc | 10/15/2012 9:00pm |
| ☐ Spreadsheet.xls | 11/21/2012 6:05pm |
| ☐ Example (user's conflicted copy 2013-04-10).doc | 04/10/2013 1:00pm |
| ☐ Example.doc | 04/10/2013 1:00pm |

*FIG. 1*

| Name | Date Modified |
|---|---|
| ☐ Document.doc | 10/15/2012 9:00pm |
| ☐ Saeadsheet.xls | 11/21/2012 6:05pm |
| ☐ Example (user's conflicted copy 2013-04-10).doc | 04/10/2013 1:00pm |
| ☐ Example.doc | 04/10/2013 1:00pm |

⚠ Do you want to view changes?  [Yes] [No]

*FIG. 2*

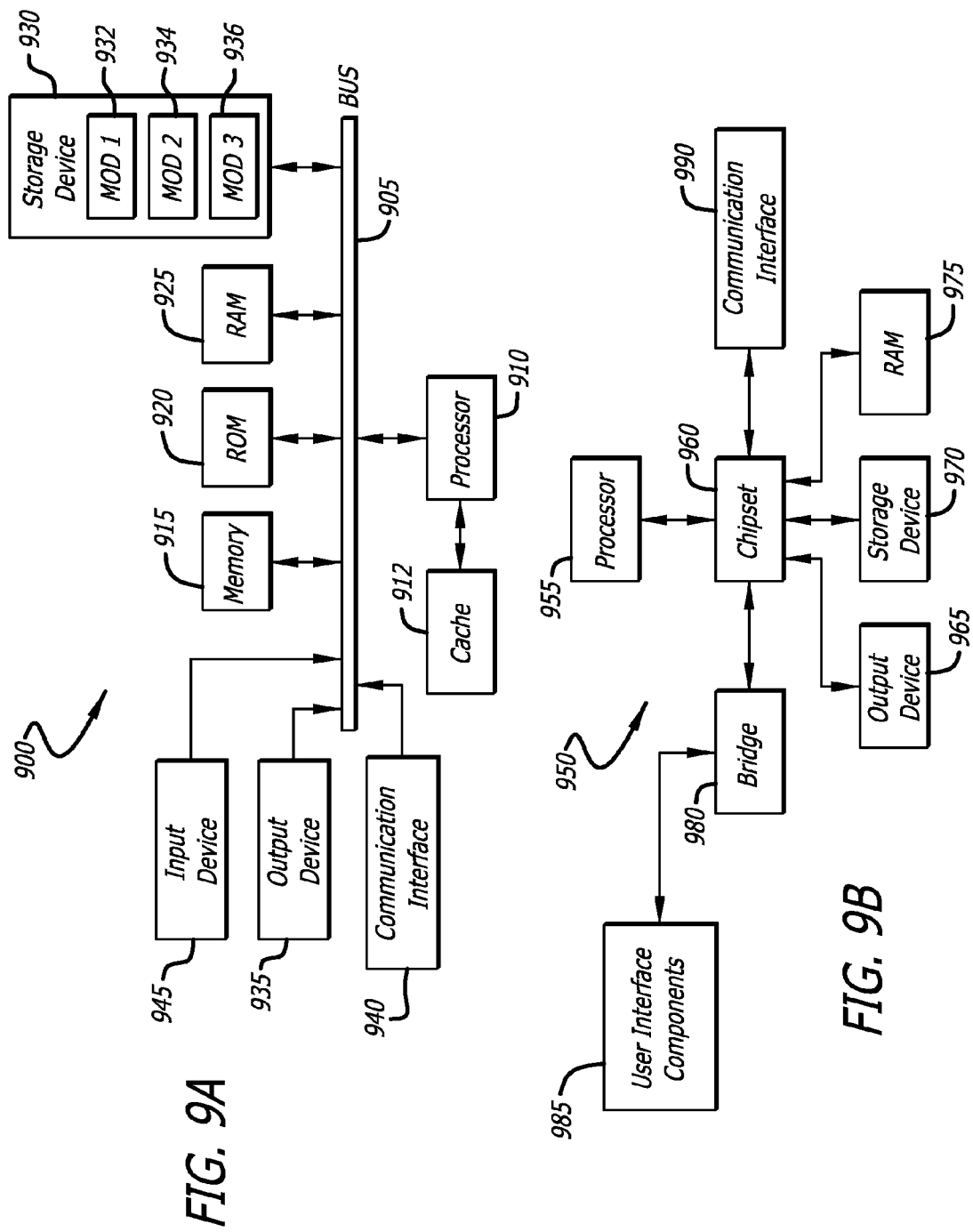

MANAGING CONFLICTED COPIES

TECHNICAL FIELD

The present technology pertains to managing conflicted copies of files, and more specifically pertains to enabling users to be alerted to and/or view changes between versions of conflicted copies.

BACKGROUND

Various applications allow multiple users to view and/or edit the same content item or a user to access the same content item from multiple devices. A problem will often arise when two people or computers change the same content item at the same time or within a period in which the content item has not synced with other parallel versions. In this instance, it may be difficult to merge the changes since each version may contain changes not present in the other. Instead, what often happens is that two versions of the content item are saved with one being marked as a conflicted copy. This method ensures that all changes are preserved and no user's work is overwritten by another. Accordingly, users are left with two copies of the same content item without knowing which version contains a particular set of changes. It can, therefore, be desirable to determine a way to both minimize the occurrence of such conflicted copies and present the differences between versions to users in an intuitive manner.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for minimizing the occurrence of conflicted copies and presenting differences between conflicting content items to users. In at least one embodiment, a user can be provided with access to modify a content item from any number of computing devices through an account with an online content management system. Each of the computing devices, in this example, may include a client-side application that communicates with the online content management system to synchronize (or sync) a copy of the content item stored locally on each computing device with data for the content item stored with the online content management system.

The conflicted copy may be the result of a delay sync between one of the user's computing devices and the online content management system. A delay sync can occur as a result of making changes to a content item while having intermittent internet connectivity or while not being connected to a network, and then reconnecting after making changes on a different device that was connected and able to sync. The conflicted copy may also be created when one of multiple users, while collaboratively sharing and editing the content item, makes changes to the content item during a period of time where the modification has not been communicated to the online content management system. Conflicted copies may also occur under other circumstances and result from situations other than those discussed above.

In one example, when a conflicted copy of a content item is identified, a notification can be provided to the user. Here, the notification may include a link to view differences between the content item and the conflicted copy. The differences, in at least one example, may include displaying the differences between a universal copy, as stored with the online content management system, to the user in a redline format. In another example, the differences between copies can be highlighted to the user using dialog boxes among other techniques. Accordingly, the user can, in at least one example, go through each conflicting instance in the content item and either accept or reject each difference to produce a current or single updated universal copy of the content item.

In another example, a warning could be provided to the user preemptively before a conflicted copy is made by anticipating circumstances where conflicted copies often occur. For example, the warning may be provided when the user starts making changes to a document on a computing device that has not synchronized for a determined period of time. In another example, the computing device may not have synchronized for the determined period of time and the file could be known to have been edited from other devices in the recent past. Accordingly, such a warning can be provided to the user to make sure to synchronize the content item prior to making further changes to the document in an effort to minimize conflicted copy generation.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 shows an exemplary content item folder that includes a conflicting copy in accordance with at least one embodiment;

FIG. 2 shows another exemplary content item folder that includes a conflicting copy in accordance with at least one embodiment;

FIG. 9A shows a conventional system bus computing system architecture; and

FIG. 9B shows a computer system having a chipset architecture.

DESCRIPTION

Figure 3:
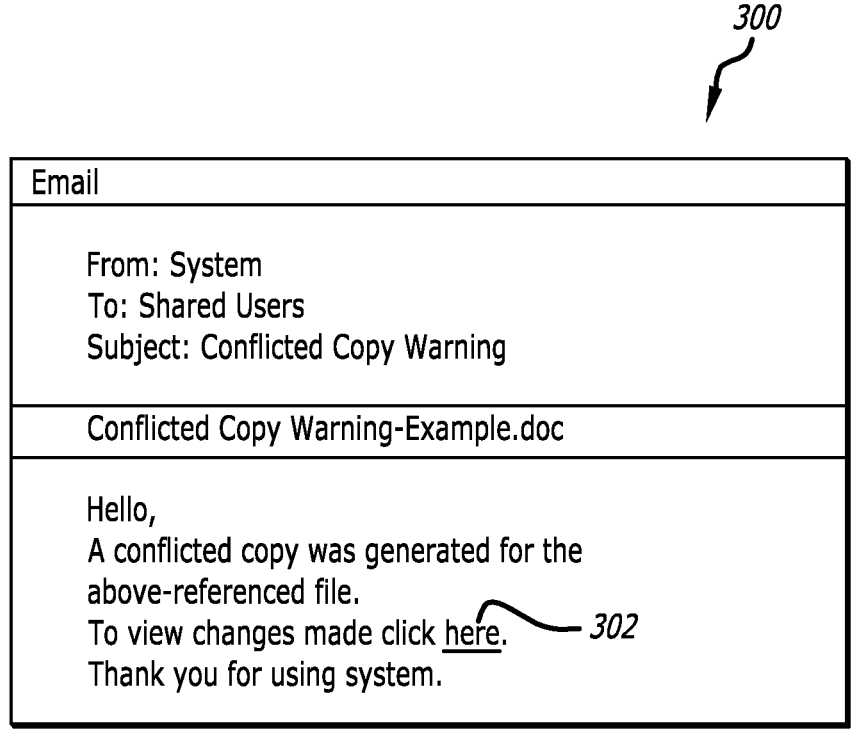
FIG. 3 shows an exemplary warning that can be provided to a user in accordance with at least one embodiment.

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for minimizing the occurrence of conflicting copies of a content item and managing, in the event a conflicting copy is generated, the copies to ensure information and work product preservation. In particular, upon identifying a conflicting copy of a content item, a user can be provided with a link to view differences between the conflicting copies. The differences, in at least one example, may include displaying, to the user, differences between copies in a redline or other such format where the user can easily identify the differences. Accordingly, the user, in at least one example, can go through each conflicting instance in the content item and either accept or reject each difference to produce a single universal copy of the content item.

In order to understand how conflicted copies are generated, it may be helpful to understand the system which causes them. In at least one embodiment, an online content management system can enable a user to upload and save a content item to one or more databases in a cloud computing environment. The online content management system can store a universal copy of the content item and enable the user to modify the content item from any number of computing devices through, for example, a personalized account. Each of the user's computing devices, in this example, can include a client-side application that communicates with the online content management system to sync a copy of the content item stored locally on each computing device with the universal copy of the content item stored with the online content management system.

Accordingly, there are number of reasons why a conflicted content item may be created from a single content item. In one example, a conflicted copy can be created when multiple users make changes to the content item during a period of time when synchronization between a computing device and the online content management system has not occurred. Additionally, a conflicted copy can be created when one user makes changes to a content item on multiple computing devices during a period of time when, again, synchronization has not occurred. Further, in one instance there could be so many content items (or so much data) in the process of being synced that a file currently being modified by a user has yet to be synced. Accordingly, by the time the content item does sync, changes inconsistent with other copies may have been created, thereby resulting in a conflicted copy. This may also occur as a result of a slow network connection speeds.

It is worth noting that synchronization can be delayed by multiple factors such as internet connectivity problems, offline interaction, bandwidth delays combined with backlogged synchronization, user disabled synchronization, and the like. When a single content item is changed on multiple devices (by one or more users), the online content management system does not know which version or combination of versions should be considered the most recent version. As a result, users are presented with "conflicted copies" so that they can individually determine which copy to keep or which changes from each copy to integrate into the universal copy.

Various other functions and advantages are described and suggested below as may be provided in accordance with the various embodiments.

FIG. 1 shows example content item folder 100, in accordance with at least one embodiment. In this example, content item folder 100 contains a number of items and includes title or name column 102 and date modified column 104 for organizing the items in content item folder 100. In various embodiments, content item folder 100 is one of a number of folders. or other organizational structures, containing content items available for retrieval from an online content management system that can offer services, such as cloud storage, file synchronization, and various other types of client software.

In one example, such a system may allow users to create a folder on each of their computing devices, such as their smartphone, tablet computer, desktop computer, laptop, and the like. The folder can be synchronized across all the devices so that the content of the folder, when changed or updated, appears the same when viewed across or from all devices, regardless of the device or platform type. Additionally, items placed in such a folder can also be accessible through a website or mobile application associated with one or more of the devices and can also be shared with the devices of other users.

In this example, folder 100 contains four content items, namely Document.doc, Spreadsheet.xls, Example.doc 106, and Example(user's conflicted copy 2013-04-10).doc 108, which is a conflicted copy. In this example, the online content management system does not know which version or combination of versions of Example.doc 106 and Example(user's conflicted copy 2013-04-10).doc 108 should be considered the universal copy or most recent version. Accordingly, in at least one embodiment, when a conflicted copy of a content item, such as Example.doc 106 and Example(user's conflicted copy 2013-04-10).doc 108, is identified, a notification can be provided to the user to alert the user that action might need to be taken to ensure information or work product preservation.

FIG. 2 shows an example notification 200 that can be presented as the user opens folder 100, in accordance with various embodiments. In this example, notification 200 can prompt 202 to ask the user if they would like to view differences between the conflicting copies of content items 106 and 108. Accordingly, upon selecting 'Yes' the user would be presented with the differences between content items 106 and 108. In another example, FIG. 3 shows an example email notification 300 that can be sent to a user when a conflicted copy is created. In this example, the user could be one of a number of users sharing and collaboratively editing Example.doc, for example, and, as a result, was sent email notification 300 when one of the other users modified the content item thus causing the creation of a conflicting copy. In this example, email notification 300 enables the user, assuming email notification 300 is timely received, to quickly determine which copy of the content item is intended to be the universal copy before further changes are made by any other shared user. In this example, as the user clicks the link in email notification 300, they could be presented with the differences between content items. Further, notifications can be provided to each of multiple users when the content item is shared and/or edited by the multiple users. Many other types of notifications or alerts may also be provided to users as well as at different times within the scope of the various embodiments.

Figure 4:
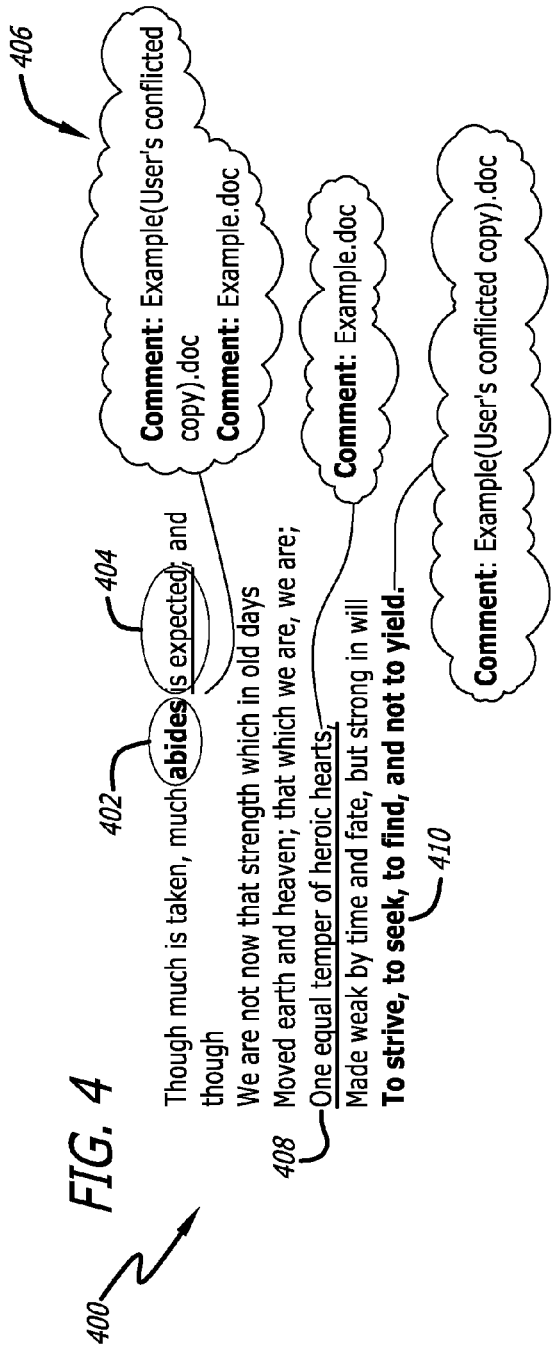
FIG. 4 shows an exemplary content item showing changes between conflicting copies in accordance with at least one embodiment.
Figure 5:
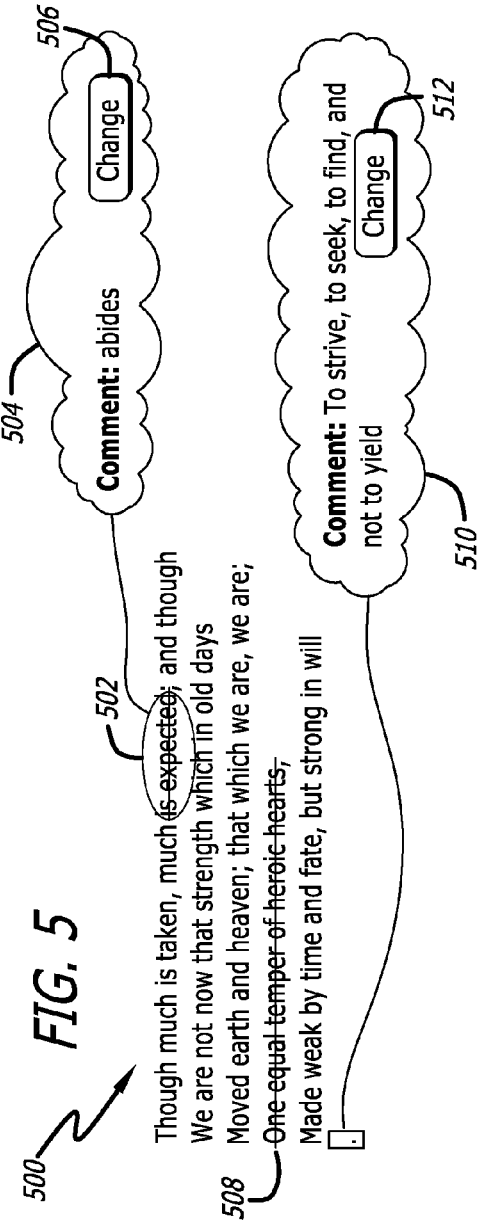
FIG. 5 shows an exemplary content item showing changes between conflicting copies in accordance with at least one embodiment.

FIGS. 4-5 show two of many possible examples, in accordance with various embodiments, of presenting differences between two conflicted copies to a user. In these two examples, the two conflicted copies have been seemingly merged together such that the differences between content items appear in a marked-up or redlined format. In both of these examples, Lord Alfred Tennyson, while composing Ulysses, could have made a first set of changes on a first computing device that was unable to sync before he eventually made additional changes on a second computing device.

Since he had either forgotten that he made the earlier changes, or couldn't remember which changes he had previously made, a conflicted copy was created when the changes were inconsistent.

FIG. 4 shows a first example of merged differences 400 between the conflicting copies of Ulysses. In this example, the text that is the same in both copies appears as normal text and the differences are both provided simultaneously, but distinguished by a visual characteristic. In this example, the text that is different in the first conflicting copy is provided in bold and the text that is different in the second conflicting copy is provided as underlined. For example, the word "abides" 402 was used in the first conflicting copy and "is expected" 404 was used in the second conflicting copy instead. Similarly, the lines "One equal temper of heroic hearts" 408 and "To strive, to seek, to find, and not to yield" 410 were each added in one copy, but were not present in the other. Accordingly, line 408 is provided in underlined format and line 410 is provided in boldface format. In one example, there can also be comment boxes 406 which tell the user which change or difference came from which copy. Accordingly, a user can quickly determine the differences between copies and, in this example, choose which version of the differences they desire. Further, each copy could also include an identifier for which of the user's computing devices a respective copy was last edited or changed in order to give the user context of the changes and when they took place.

In another example, FIG. 5 shows merged differences 500 between the conflicting copies of Ulysses. In this example, one of the copies is used as a base copy and the changes relative to the other conflicting copy are layered on top of the base copy including comment boxes that enable the user to identify differences and choose between alternative versions. In this example, the base copy had "is expected" 502 in the first line; however, the conflicted copy had the word "abides" in its place. In order to communicate this to the user, in this example, "is expected" 502 is highlighted and a comment box 504 pointing to "is expected" 502 includes what was changed in the other copy, namely "abides," and includes a "Change" icon 506, which if selected can change "is expected" 502 to "abides." Moving down the poem, "One equal temper of heroic hearts" 508 also appeared in the base copy, but was removed or not present in the conflicting copy and "To strive, to seek, to find, and not to yield" was added in the conflicting copy, but not present in the base copy. Accordingly, "To strive, to seek, to find, and not to yield" is provided in comment box 510 and the user can select "change" icon 512 to insert and keep this line in the final or universal copy of the content item.

Accordingly, the user can go through each instance of the changes or differences between each of the conflicting copies and select the change or version most desirable to the user. In this example, Lord Alfred Tennyson chose to keep both "One equal temper of heroic hearts" 508 and "To strive, to seek, to find, and not to yield," which were each added in different conflicting copies, yet chose to exchange "is expected" 502 with "abides" in his final version of Ulysses. Had Tennyson not been presented with both changes, Ulysses, in this example, may not have included both "One equal temper of heroic hearts" 508 and "To strive, to seek, to find, and not to yield."

Further, there are many ways to show the difference between conflicting copies that are either textual, similar to what has been shown in these examples, or with highlighting, varying colors, varying fonts, and the like. Further, similar changes can be adapted to various types of files, such as documents, spreadsheets, presentations, photos, and the like.

Figure 6:
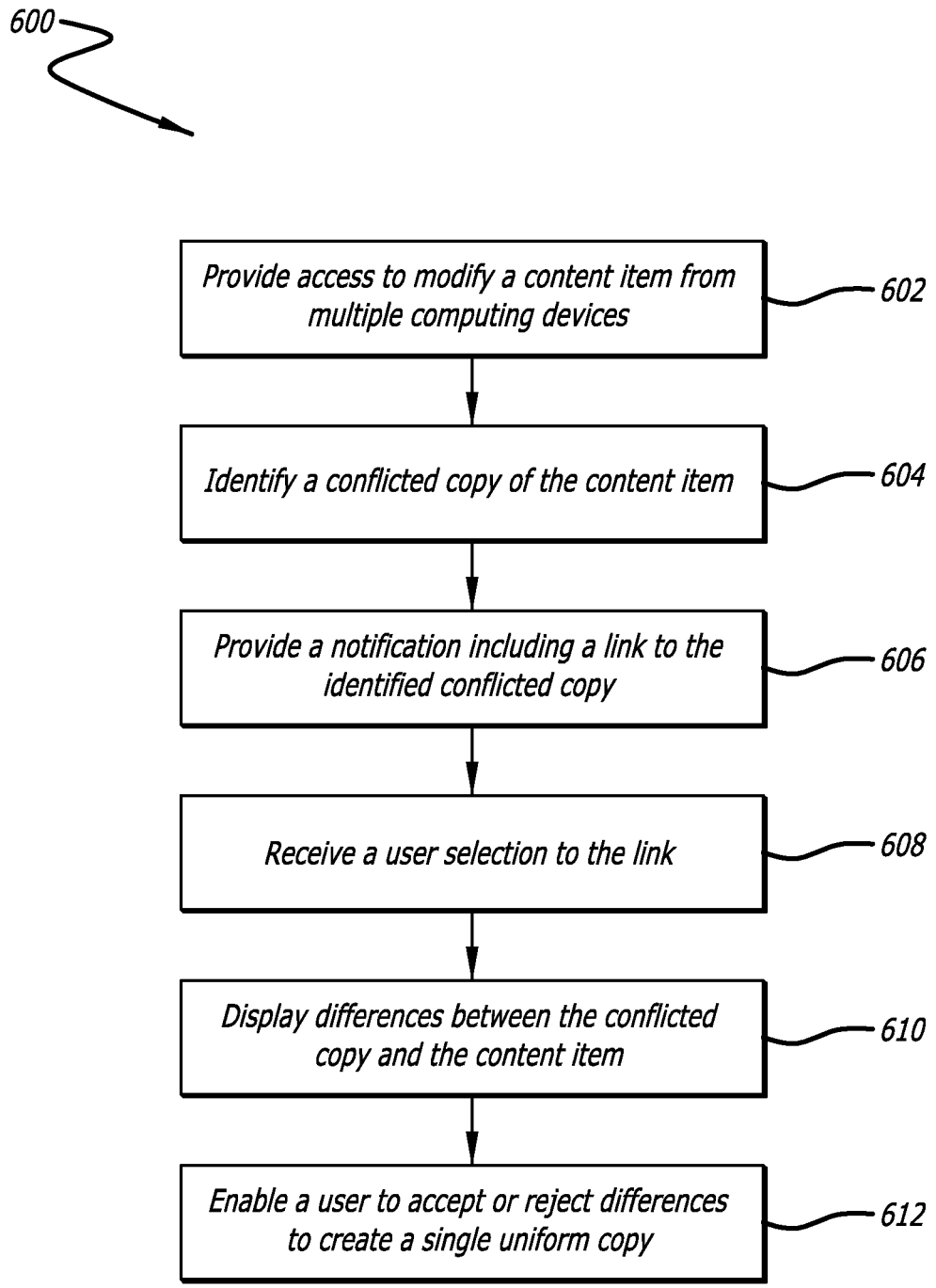
FIG. 6 shows an example process in accordance with at least one embodiment.

FIG. 6 illustrates an example process 600 for enabling users to manage conflicting copies of a content item, in accordance with various embodiments. It should be understood that, for any process discussed herein, there can be additional, fewer, or alternative steps performed in similar or alternative orders, or in parallel, within the scope of the various embodiments unless otherwise stated.

In this example, a user is provided 602 with access to modify a content item from a number of computing devices through an account with an online content management system. Here, each of the computing devices can include a client-side application that communicates with the online content management system to sync a copy of the content item stored locally on each computing device with data for the content item stored with the online content management system.

When a conflicted copy of a content item is identified 604, a notification can be provided 606 to the user. Here, the notification can include a link to view differences between the content item and the conflicted copy. The link, in one example, can be a hyperlink to navigate the user to view the differences; however, the link can also be a prompt, such as prompt 202 described with respect to FIG. 2, or any other mechanism for enabling the user to view the difference between the content item and the conflicted copy.

In this example, a user selection of the link is received 608 and the differences between the content item and the conflicted copy are displayed 610 to the user. Accordingly, the online content management system enables 612 the user to be able to go through each conflicting instance between conflicting copies to either accept or reject each difference in order to produce a final universal copy of the content item. Various other approaches can be used as well as discussed or suggested elsewhere herein.

In at least one embodiment, a warning could be provided when a user opens or starts to make changes to a content item on a device that has not synchronized for a determined amount of time. In particular, a warning can be provided when the device has not been synchronized for the determined amount of time where the file is known to have been edited from the user's other computing devices or from computing devices of other users in the past. Accordingly, the warning can remind the user to make sure synchronization has completed prior to viewing the document.

Figure 7:
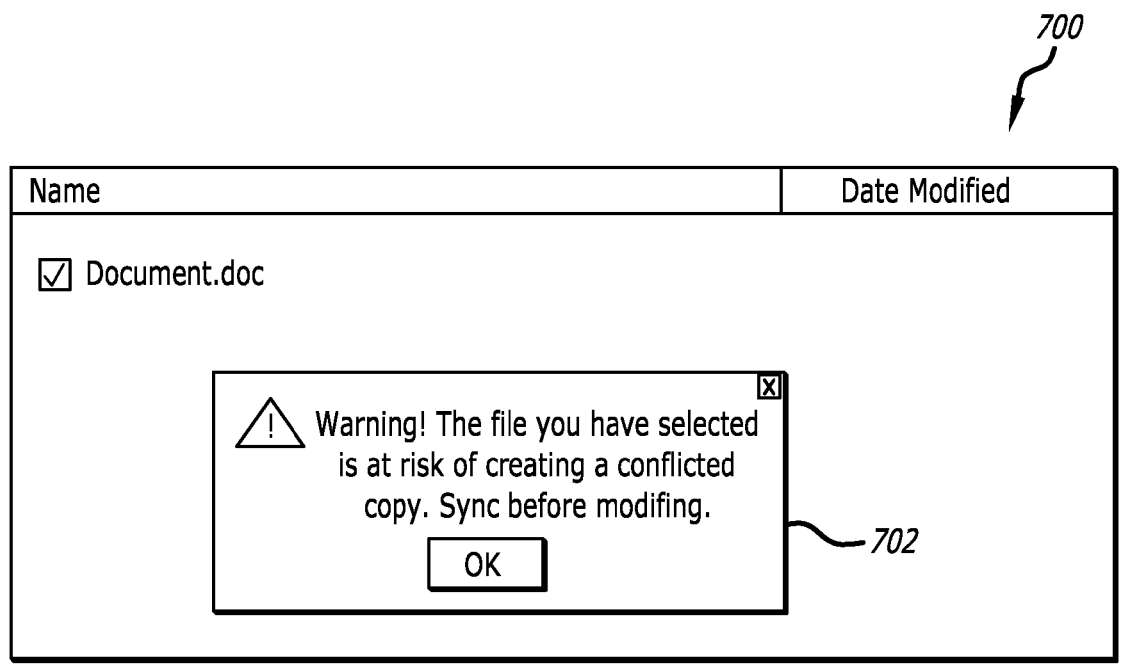
FIG. 7 shows another exemplary warning that can be provided to a user in accordance with at least one embodiment.

FIG. 7 shows an example warning 700 for reminding a user to sync before editing a content item, in accordance with various embodiments. In this example, a user has opened a content item folder and selected Document.doc. In one example, when the user opens the content item folder, a client-side application associated with the online content management system attempts to sync the folder with the system to retrieve the most recent version of content items therein. If the folder is unable to sync with the online content management system, prompt 702 can be provided to the user to warn the user that making changes to this content item creates an increased risk of generating a conflicted copy. Accordingly, the user can either sync the folder before editing or wait to continue editing until the content item can be synced.

In one example, upon being unable to sync, the client-side application may determine the time the content item was synced with the online content management system. If the content item has not be synced for a determined period of time, the content item may be consider a stale content item, and a warning could be provided. Other such factors may also include identifying that a particular content item has been modified on multiple computing devices greater than a determined number times within a determine period of time.

Accordingly, upon being unable to sync, a warning could be provided to the user. Further, a warning may also be provided upon determining that a content item has been modified, but that the modifications have not been synced with the online content management system. Various other approaches can be used as well as discussed or suggested elsewhere herein.

Figure 8:
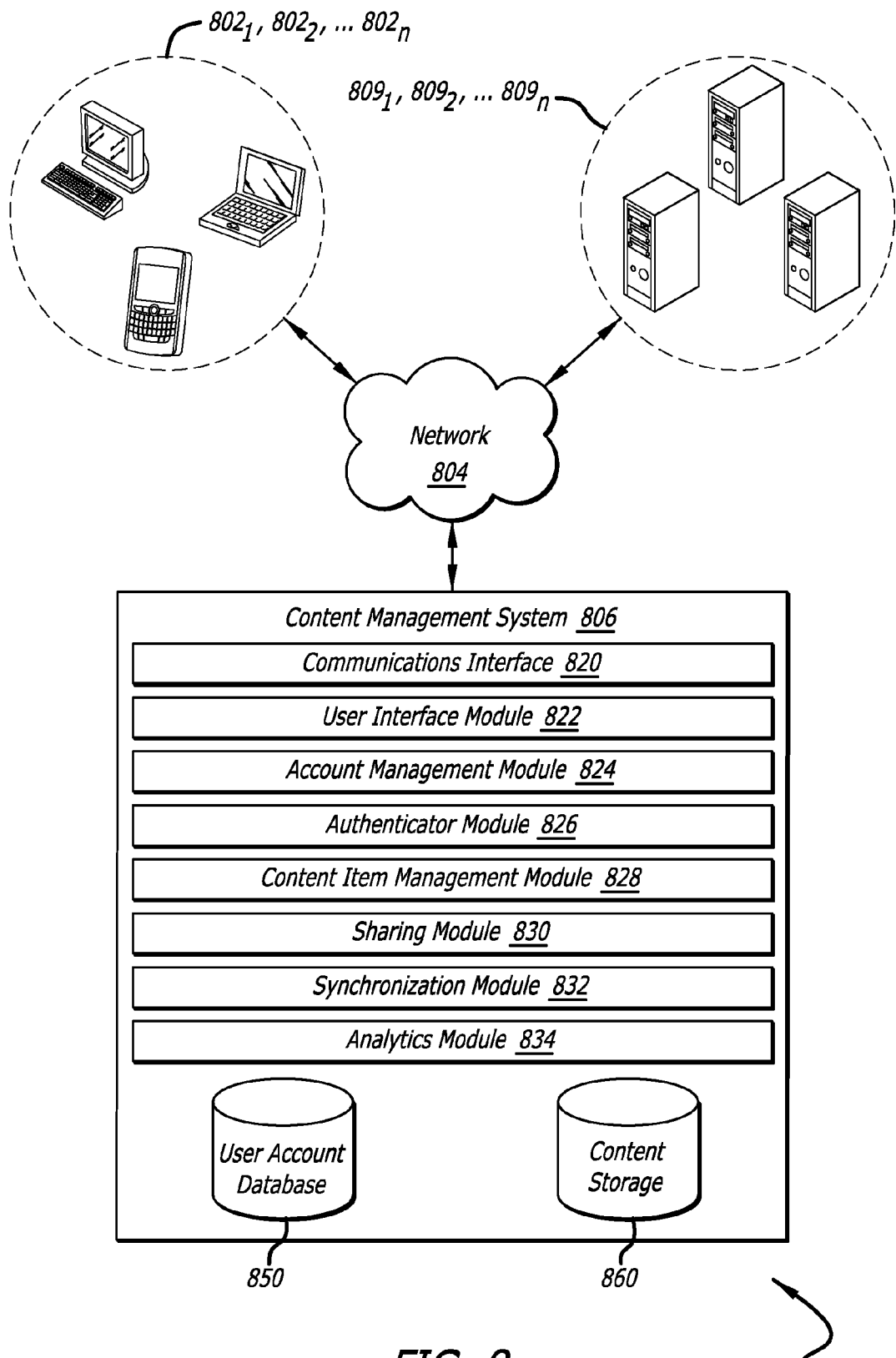
FIG. 8 shows an exemplary configuration of devices and a network in accordance with the invention.

An exemplary system configuration 800 for sharing documents and providing synchronized comments among users for the shared documents is shown in FIG. 8, wherein computing devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, a user can interact with content management system 806 through computing devices $802_1$, $802_2, \ldots, 802_n$ (collectively "802") connected to network 804 by direct and/or indirect communication. Content management system 806 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 802 can be of varying type, capabilities, operating systems, etc. Furthermore, content management system 806 can concurrently accept connections from and interact with multiple computing devices 802.

A user can interact with content management system 806 via a client-side application installed on computing device $802_i$. In some embodiments, the client-side application can include a content management system specific component. For example, the component can be a stand-alone application, one or more application plug-ins, and/or a browser extension. However, the user can also interact with content management system 806 via a third-party application, such as a web browser, that resides on computing device $802_i$ and is configured to communicate with content management system 806. In either case, the client-side application can present a user interface (UI) for the user to interact with content management system 806. For example, the user can interact with the content management system 806 via a client-side application integrated with the file system or via a webpage displayed using a web browser application.

Content management system 806 can make it possible for a user to store content, as well as perform a variety of content management tasks, such as retrieve, modify, browse, and/or share the content. Furthermore, content management system 806 can make it possible for a user to access the content from multiple computing devices 802. For example, computing device $802_i$ can upload content to content management system 806 via network 804. The content can later be retrieved from content management system 806 using the same computing device $802_i$ or some other computing device $802_j$.

To facilitate the various content management services, a user can create an account with content management system 806. The account information can be maintained in user account database 850. User account database 850 can store profile information for registered users. In some cases, the only personal information in the user profile can be a username and/or email address. However, content management system 806 can also be configured to accept additional user information.

User account database 850 can also include account management information, such as account type, e.g. free or paid; usage information, e.g. file edit history; maximum storage space authorized; storage space used; content storage locations; security settings; personal configuration settings; content sharing data; etc. Account management module 824 can be configured to update and/or obtain user account details in user account database 850. The account management module 824 can be configured to interact with any number of other modules in content management system 806.

An account can be used to store content, such as digital data, documents, text files, audio files, video files, etc., from one or more computing devices 802 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from computing devices 802 so that computing devices 802 do not need to know exactly where the content items are being stored by content management system 806. In one variation, content management system 806 can store the content items in the same folder hierarchy as they appear on computing device $802_i$. However, content management system 806 can store the content items in its own order, arrangement, or hierarchy. Content management system 806 can store the content items in a network accessible storage (SAN) device, in a redundant array of inexpensive disks (RAID), etc. Content storage 860 can store content items using one or more partition types, such as FAT, FAT32, NTFS, EXT2, EXT3, EXT4, ReiserFS, BTRFS, and so forth.

Content storage 860 can also store metadata describing content items, content item types, and the relationship of content items to various accounts, folders, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate files or duplicate segments of files. Instead of storing multiple copies, content storage 860 can store a single copy and then use a pointer or other mechanism to link the duplicates to the single copy. Similarly, content storage 860 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 806 can be configured to support automatic synchronization of content from one or more computing devices 802. The synchronization can be platform agnostic. That is, the content can be synchronized across multiple computing devices 802 of varying type, capabilities, operating systems, etc. For example, computing device $802_i$ can include client software, which synchronizes, via a synchronization module 832 at content management system 806, content in computing device $802_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 806. Conversely, the background process can identify content that has been updated at content management system 806 and synchronize those changes to the local folder. The client software can provide notifications of synchronization operations, and can provide indications of content statuses directly within the content management application. Sometimes computing device $802_i$ may not have a network connection available. In this scenario, the client software can monitor the linked folder for file changes and queue those changes for later synchronization to content management system 806 when a network connection is available. Similarly, a user can manually stop or pause synchronization with content management system 806.

A user can also view or manipulate content via a web interface generated and served by user interface module 822. For example, the user can navigate in a web browser to a web address provided by content management system 806. Changes or updates to content in the content storage 860 made through the web interface, such as uploading a new version of a file, can be propagated back to other computing devices 802 associated with the user's account. For example, multiple computing devices 802, each with their own client software, can be associated with a single account and files in the account can be synchronized between each of the multiple computing devices 802.

Content management system 806 can include a communications interface 820 for interfacing with various computing devices 802, and can interact with other content and/or service providers $809_1, 809_2, \ldots, 809_n$ (collectively "809") via an Application Programming Interface (API). Certain software applications can access content storage 860 via an API on behalf of a user. For example, a software package, such as an app on a smartphone or tablet computing device, can programmatically make calls directly to content management system 806, when a user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific computing devices, and so forth, to ensure only authorized clients and users can access files. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any computing device in network communication with content management system 806. Sharing content privately can include linking a content item in content storage 860 with two or more user accounts so that each user account has access to the content item. The sharing can be performed in a platform agnostic manner. That is, the content can be shared across multiple computing devices 802 of varying type, capabilities, operating systems, etc. The content can also be shared across varying types of user accounts.

In some embodiments, content management system 806 can include a content item management module 828 for maintaining a content directory. The content directory can identify the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 6 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 6 or true. Thus, access to a content item for which a URL has been generated can be easily restricted by changing the value of the URL active flag. This allows a user to restrict access to the shared content item without having to move the content item or delete the generated URL. Likewise, sharing module 830 can reactivate the URL by again changing the value of the URL active flag to 6 or true. A user can thus easily restore access to the content item without the need to generate a new URL.

While content management system 806 is presented with specific components, it should be understood by one skilled in the art, that the architectural configuration of system 806 is simply one possible configuration and that other configurations with more or less components are also possible.

FIG. 9A, and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   under the control of one or more computer systems configured with executable instructions,
   storing, at an online content management system, a universal copy of a content item with a plurality of computing devices locally storing the content item, the plurality of computing devices communicating with the online content management system to synchronize respective local copies of the content item and the universal copy of the content item;
   identifying a conflicted copy of the content item resulting from a delayed synchronization between at least one of the plurality of computing devices and the online content management system; and
   notifying a computing device of the identified conflicted copy, the notification displaying one or more identified differences between the universal copy of the content item and the conflicted copy, wherein the notification is configured to enable a user to individually accept or reject each of the one or more identified differences to produce a current universal copy of the content item.

2. The computer-implemented method of claim 1, wherein the conflicted copy is created when at least one of multiple users collaboratively sharing the content item makes at least one modification to the content item during a period of time where the at least one modification has not been communicated to the online content management system.

3. The computer-implemented method of claim 1, wherein the conflicted copy is created when the user makes at least one modification to the content item from two or more computing devices during a period of time where the at least one modification has not been communicated to the online content management system.

4. The computer-implemented method of claim 1, further comprising, prior to the conflicted copy being created at a respective computing device:
   determining that, since a last synchronization between the respective computing device and the online content management system, the universal copy has been changed based on a modification provided from a different computing device; and
   prompting the respective computing device to synchronize with the online content management system before modifying a respective local copy of the content item stored at the respective computing device.

5. The computer-implemented method of claim 1, wherein the delayed sync is associated with at least one of poor internet connectivity, offline interaction, backlogged synchronization, or user initiated disabled synchronization communication.

6. The computer-implemented method of claim 1, further comprising:
   for each respective difference from the one or more identified differences, receiving a respective user selection to accept or reject the respective difference; and
   generating the current universal copy of the content item by respectively including or excluding each of the one or more identified differences based on the respective user selection.

7. The computer-implemented method of claim 1, further comprising, prior to the conflicted copy being created at a respective computing device:
   determining that, since a last synchronization between the respective computing device and the online content management system, the universal copy has been changed based on a modification provided from a different computing device; and
   notifying the respective computing device that modifying a respective local copy of the content item stored at the respective computing device can result in the conflicted copy.

8. A non-transitory computer-readable storage medium storing instructions that, when executed by at least one processor, cause a computing device to:
   provide a user with access to modify a content item from a plurality of computing devices through an account of an online content management system, each of the plurality of computing devices including a client-side application that communicates with the online content management system to sync a copy of the content item stored locally on each computing device with data for the content item stored with the online content management system;

identify a conflicted copy of the content item resulting from a delayed sync between at least one of the plurality of computing devices and the online content management system; and provide a notification to the user of the identified conflicted copy of the content item, the notification including a link to view at least one difference between the content item and the conflicted copy.

9. The non-transitory computer-readable storage medium of claim 8, wherein the conflicted copy is created when at least one of multiple users collaboratively sharing the content item makes at least one modification to the content item during a period of time where the at least one modification has not been communicated to the online content management system.

10. The non-transitory computer-readable storage medium of claim 9, wherein the notification is sent to each of the multiple users.

11. The non-transitory computer-readable storage medium of claim 8, wherein the conflicted copy is created when the user makes at least one modification to the content item from two or more computing devices during a period of time where the at least one modification has not been communicated to the online content management system.

12. The non-transitory computer-readable storage medium of claim 8, wherein the content item is at least one of a word processing document, a spreadsheet, a presentation, a video, streaming content, or an image.

13. The non-transitory computer-readable storage medium of claim 8, wherein the delayed sync is associated with at least one of poor internet connectivity, offline interaction, back-logged synchronization, or user initiated disabled synchronization.

14. The non-transitory computer-readable storage medium of claim 8, wherein the instructions that, when executed by the at least one processor, further cause the computing device to:

display the at least one difference between the content item and the conflicted copy to the user.

15. The non-transitory computer-readable storage medium of claim 8, wherein the instructions that, when executed by the at least one processor, further cause the computing device to:

enable the user to accept or reject the at least one difference between the content item and the conflicted copy to the user to determine a current universal copy of the content item.

16. A computing system, comprising:

at least one processor; and memory including instructions that, when executed by the processor, cause the computing device to:

store a copy of a content item synchronized across plurality of computing devices through an account of an online content management system, each computing device including a client-side application that communicates with the online content management system to sync a respective copy of the content item stored locally on each computing device with data for the content item stored with the online content management system;

in response to being unable to sync the copy of the content item with the online content management system, determine when the computing device last synced the copy of the content item with the online content management system; and in response to detecting that the online content management system has received an updated copy of the content item from a different computing device since the computing device last synced the copy of the content item, provide a warning to a user to sync the copy of the content item before modifying the copy of the content item.

17. The computing system of claim 16, wherein the instructions that, when executed by the at least one processor, further cause the computing system to:

identify the content item as being associated with a determined number of modifications made on multiple computing devices of the plurality of computing devices within a determine period of time.

18. The computing system of claim 16, wherein the warning is provided when the user attempts to modify the content item.

19. The computing system of claim 16, wherein the warning is provided when the user attempts to open the content item.

20. The computing system of claim 16, wherein providing the warning includes:

determining that the content item includes modifications; and determining that the modifications have not been synced with the online content management system.

* * * * *